Figure 1:
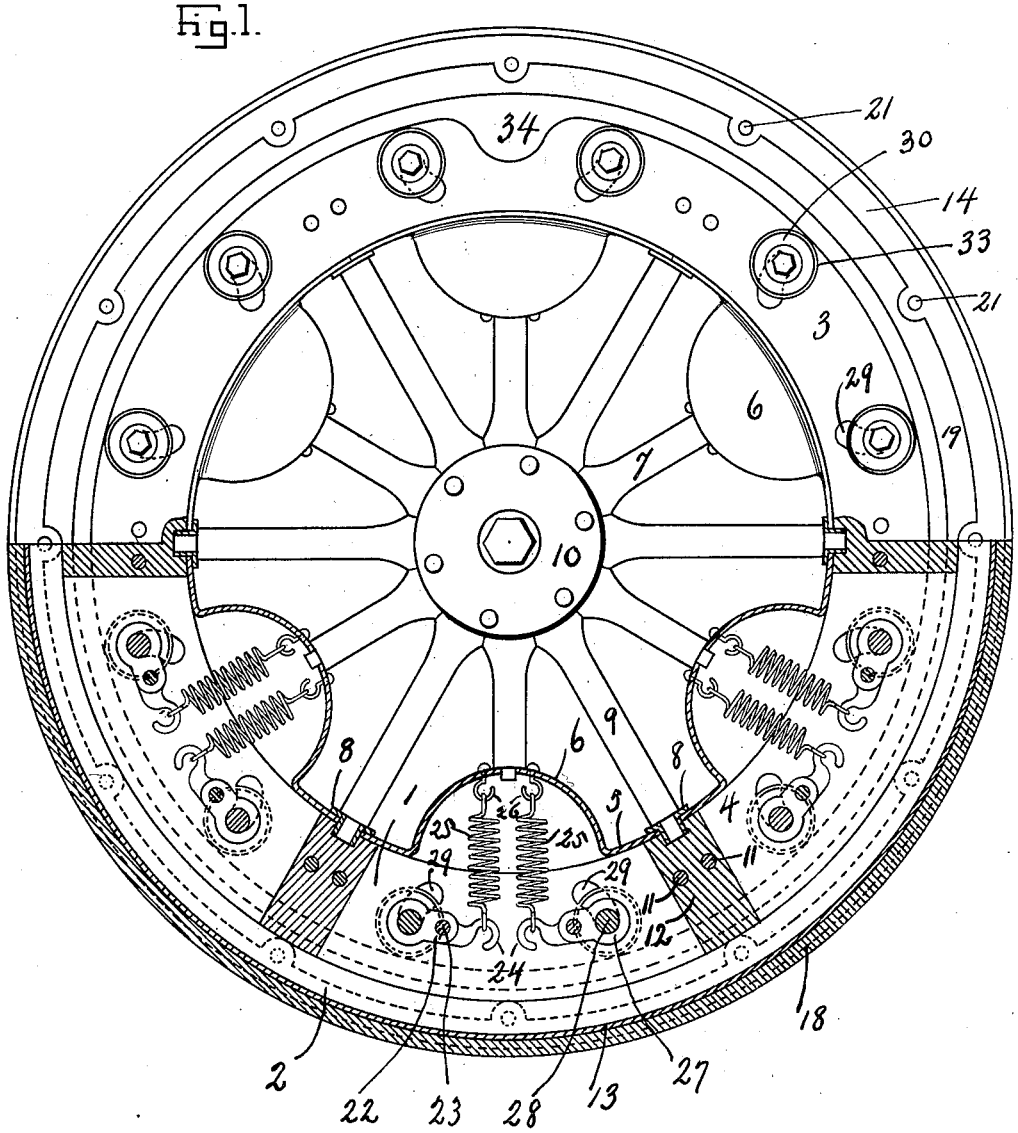

J. A. STAHLE.
WHEEL.
APPLICATION FILED JAN. 11, 1910. RENEWED SEPT. 5, 1913.

1,092,183.

Patented Apr. 7, 1914.

3 SHEETS—SHEET 1.

WITNESSES:

INVENTOR.

John A. Stahle.

J. A. STAHLE.
WHEEL.
APPLICATION FILED JAN. 11, 1910. RENEWED SEPT. 5, 1913.
1,092,183.
Patented Apr. 7, 1914.
3 SHEETS—SHEET 2.
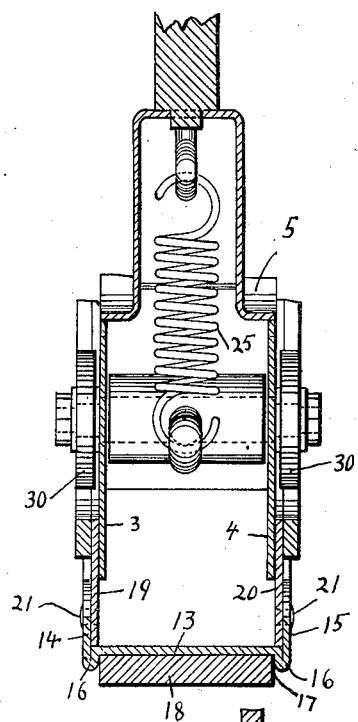
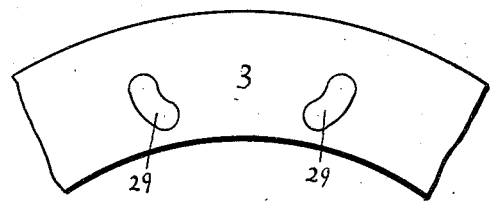
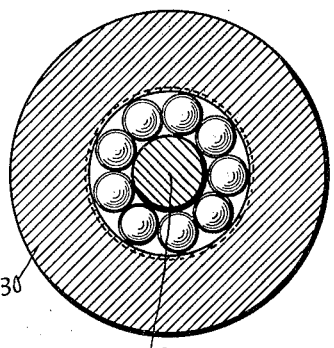
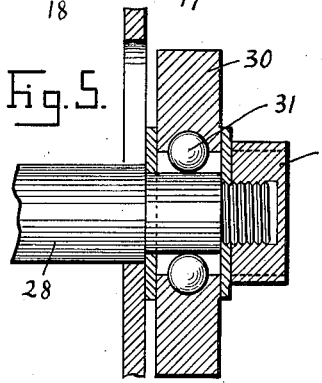
WITNESSES:
INVENTOR
John A. Stahle.

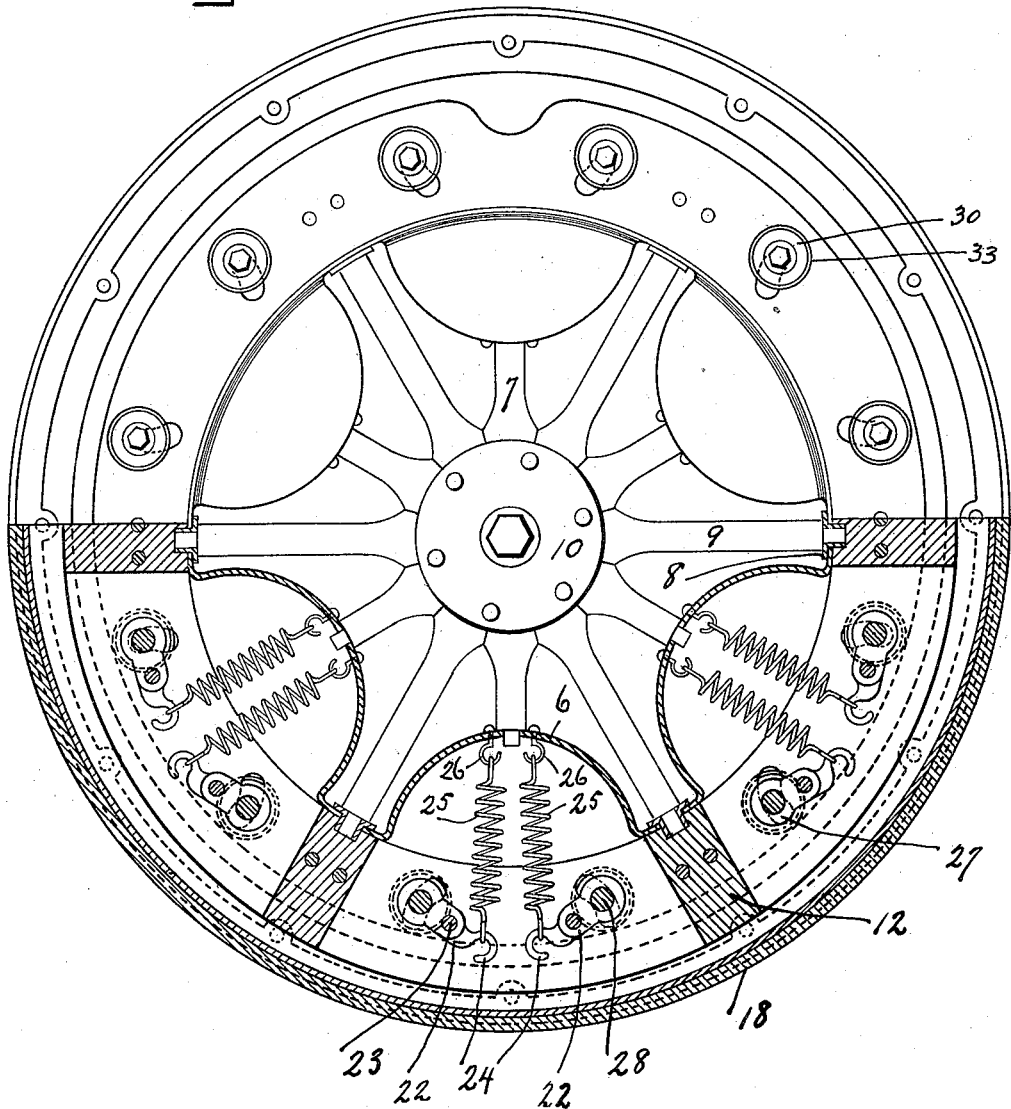

UNITED STATES PATENT OFFICE.

JOHN A. STAHLE, OF BOSTON, MASSACHUSETTS, ASSIGNOR, BY MESNE ASSIGNMENTS, TO STAHLE MECHANICAL TIRE COMPANY, LIMITED, A CORPORATION OF MAINE.

WHEEL.

1,092,183.  Specification of Letters Patent.  Patented Apr. 7, 1914.

Application filed January 11, 1910, Serial No. 537,520. Renewed September 5, 1913. Serial No. 788,326.

*To all whom it may concern:*

Be it known that I, JOHN A. STAHLE, citizen of Finland, residing at Boston, in the county of Suffolk and State of Massachusetts, have invented certain new and useful Improvements in Wheels; and I do hereby declare the following to be a full, clear, and exact description of the invention, such as will enable others skilled in the art to which it appertains to make and use the same.

My invention relates to wheels for vehicles and more particularly to a wheel designed for automobiles and like vehicles.

The object of my invention is to produce a cushioned or resilient wheel which in action shall approximate the action of the well known pneumatic tired wheel, but which shall be entirely free from the troubles attending the use of rubber tires and particularly pneumatic tires.

To the above ends my invention consists of the improved wheel and the devices and combinations of devices which will be hereinafter described and claimed.

My improved wheel is shown in the accompanying drawing in which—

Figure 1 shows partly in side elevation and partly in section a wheel embodying the invention. Fig. 2 shows a radial sectional view taken through the rim and tire portions of the wheel shown in Fig. 1, said section being taken adjacent one of the spring-actuated levers. Fig. 3 shows a side view of a portion of one of the rim plates. Fig. 4 shows a sectional view through one of the pressure rolls taken on a line at right angles to its axis of rotation. Fig. 5 shows a sectional view through one of the pressure rolls and a portion of one of the rim plates on a line with the axis. Fig. 6 shows a view illustrating the action of the wheel under a load strain.

Similar reference characters will be employed to designate corresponding parts.

The wheel comprises a rim portion 1 and a tire portion 2, the tire portion being loosely connected to the rim portion so as to move radially with relation thereto under a load strain which movement is yieldingly resisted by a compression resistance mechanism interposed between the rim and tire portions all as will be hereinafter set forth.

The rim portion 1 consists of the circular side plates 3 and 4 and the crown or base plate 5 all united in such manner as to form a substantially trough shaped rim as may be seen from the inspection of Figs. 1 and 2.

The crown plate 5 at intervals is provided with the domes or chambers 6 to which are connected the short spokes 7, and between such domes 6 with the spoke sockets 8 which receive the ends of the long spokes 9, the spokes radiating from a suitable hub 10. For strengthening purposes beneath the spoke sockets 8 and between the side plates 3 and 4 there are securely fastened by means of the bolts 11 the blocks 12, into which the spoke sockets 8 project, see Fig. 1.

The tire portion consists of a circular trough shaped ring comprising a tread plate 13 and the side plates 14 and 15 all preferably formed integrally of pressed steel and the side plates connected preferably to the tread plate by the doubled edges 16 which will preferably extend slightly beyond the tread face of the plate 13 thus forming a shallow groove or channel 17 in which may be fitted a sound deadening tread 18 of canvas, leather, rubber or other suitable material. The tire portion also comprises the circular bearing plates 19 and 20 which are fitted within the plates 14 and 15, and are riveted at the points 21 to the inner faces of the plates 14 and 15.

The bearing plates 19 and 20 fit closely against the outer surfaces of the side plates 3 and 4 of the rim portion and when the parts are fitted together as shown in the drawing, the entire tire portion is capable of a radial movement under a load strain with relation to the rest of the wheel comprising the hub and rim portion.

The permanent connection between the rim and tire portions consists of a compression resistance mechanism which, while maintaining a permanent connection of the rim and tire, yet is so constructed as to permit a relative radial movement and to cushion such movement. This compression resistance mechanism consists of the levers 22 which are fulcrumed upon the rods 23 mounted in the side plates 3 and 4 of the rim portion and having hooked ends 24. The hooked ends of adjacent pairs of levers extend toward each other and beneath the domes 6 and are engaged by the lower ends of the coiled springs 25 which at their opposite ends are connected to hooks 26 attached to the tops of the domes 6. These springs are constantly pulling upon the hooked ends of the levers, thus forcing the ends 27 of the levers outward or radially toward the tire portion, and the ends 27 carry shafts 28, the ends of which project through curved slots 29 in the side plates 3 and 4 of the rim portion, and which at their outer ends, carry rollers 30 which rest upon the inner edges of the bearing plates 19 and 20 of the tire portion, the bearing plates 19 and 20 preferably being thickened adjacent said slots to make a track or bearing surface for the rolls 30, as clearly seen in Fig. 2. As shown in the drawing there are six pairs of these levers carrying rollers and they are disposed at equal distances about the wheel so that the tire portion is equally supported at all points about its circumference.

The pulling action of the springs causes the rollers 30 to forcibly press and bear upon the bearing plates 19 and 20 of the tire portion, thus providing a yielding cushion or support between the rim and tire portion to yieldingly resist and cushion the relative movement of the rim and tire portions under a compressive load strain.

The rollers 30 will preferably be mounted upon ball bearings 31 and are held in place by means of nuts 32 screwed upon the ends of the shafts 28. If desired the rolls 30 may be provided about their peripheries with a sound deadening covering 33.

In order to prevent the tire portion from turning completely around with relation to the rim portion the bearing plates 19 and 20 will be provided with the projections 34 which extend inward and radially between a pair of rollers 30, see Fig. 1, thus while permitting a slight relative turning of the rim and tire portion, preventing a complete relative turning movement.

The operation is shown in Fig. 6 from which it may be seen that the hub spokes and rim may move relatively to the tire under a load strain the levers and rolls giving way yieldingly against the tension of the springs as the wheel revolves.

Having described my invention I claim as new and desire to protect by Letters Patent of the United States:—

1. A wheel comprising a rim portion and a continuous tire portion provided with bearing plates embracing the rim portion, spring actuated levers mounted within the rim portion, shafts carried by said levers and projecting outside the rim portion, and rollers mounted on said shafts and bearing against the bearing plates of the tire portion, substantially as described.

2. A wheel comprising a circular trough shaped rim portion and a continuous circular trough shaped tire portion, the side plates of the tire portion adapted to move with relation to the rim portion, a plurality of levers pivotally mounted within the rim portion and projecting outside of the rim portion at both sides, rollers mounted upon the levers and engaging the tire portion and springs acting upon the levers, substantially as described.

3. A wheel comprising a circular trough shaped rim portion and a circular trough shaped tire portion arranged to have a movement with relation to the rim portion, means to limit the relative circumferential movement of the tire portion with relation to the rim portion, spring actuated levers mounted in the rim portion, shafts carried by said levers and projecting through the sides of the rim portion and rollers carried by said shafts and bearing on the tire portion substantially as described.

4. A wheel comprising a rim portion and a continuous tire portion capable of movement relative to the rim portion, bearing plates carried by said tire portion, spring actuated levers mounted within the rim portion and said arms rigid with the levers and situated exterior to the rim portion, said arms having bearing against the bearing plates of the tire portion, substantially as described.

5. A wheel comprising a circular trough shaped rim portion and a continuous circular trough shaped tire portion, the side plates of the tire portion embracing and adapted to move with relation to the rim portion, rocking levers pivotally mounted within the rim portion, curved slots in said rim portion and shafts carried by said leaves and projecting through said slots and having a bearing engagement with the tire portion, and springs acting on said levers, substantially as described.

6. A wheel comprising a circular trough shaped rim portion and a circular trough shaped tire portion, the tire portion having a radial movement with relation to the rim portion, pivoted levers mounted within said rim portion, said levers being arranged in pairs with the levers of each pair oppositely disposed and facing each other and each lever carrying at one end an anti-friction roller adapted to engage the tire portion, and springs connected to the opposite ends of said levers, substantially as described.

7. A wheel comprising a circular trough shaped rim portion, and a continuous circular trough shaped tire portion, having a sliding engagement with said rim portion, oppositely extending pivoted levers arranged in pairs carried by said rim portion, the outer ends of said levers carrying antifriction rollers engaging the tire portion and the inner ends of said levers connected to springs, one end of which springs are anchored to the rim portion, substantially as described.

In testimony whereof I affix my signature, in presence of two witnesses.

JOHN A. STAHLE.

Witnesses:
T. HART ANDERSON,
J. M. BLYTH.

Copies of this patent may be obtained for five cents each, by addressing the "Commissioner of Patents, Washington, D. C."

It is hereby certified that in Letters Patent No. 1,092,183, granted April 7, 1914, upon the application of John A. Stahle, of Boston, Massachusetts, for an improvement in "Wheels," errors appear in the printed specification requiring correction as follows: Page 2, line 96, strike out the word "said"; same page, line 109, for the word "leaves" read *levers;* and that the said Letters Patent should be read with these corrections therein that the same may conform to the record of the case in the Patent Office.

Signed and sealed this 5th day of May, A. D., 1914.

[SEAL.]

J. T. NEWTON,
*Acting Commissioner of Patents.*